United States Patent
Lv et al.

(10) Patent No.: US 11,410,340 B2
(45) Date of Patent: Aug. 9, 2022

(54) METHOD FOR COMPRESSING TEXTURE DATA, DEVICE FOR COMPRESSING TEXTURE DATA, STORAGE MEDIUM, AND ELECTRONIC APPARATUS

(71) Applicants: Beijing BOE Optoelectronics Technology Co., Ltd., Beijing (CN); BOE Technology Group Co., Ltd., Beijing (CN)

(72) Inventors: Yaoyu Lv, Beijing (CN); Hongzhen Xue, Beijing (CN); Fuqiang Ma, Beijing (CN); Guixin Yan, Beijing (CN); Lili Chen, Beijing (CN); Hao Zhang, Beijing (CN); Zhanshan Ma, Beijing (CN); Yachong Xue, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 16/912,357

(22) Filed: Jun. 25, 2020

(65) Prior Publication Data
US 2021/0183111 A1    Jun. 17, 2021

(30) Foreign Application Priority Data
Dec. 16, 2019   (CN) .......................... 201911292540.0

(51) Int. Cl.
*G06T 9/00* (2006.01)
*G06T 3/40* (2006.01)
(Continued)

(52) U.S. Cl.
CPC ................ *G06T 9/001* (2013.01); *G06T 3/40* (2013.01); *G06T 15/04* (2013.01); *G06T 17/005* (2013.01); *G06T 17/20* (2013.01)

(58) Field of Classification Search
CPC .......... G06T 9/001; G06T 3/40; G06T 15/04; G06T 17/005; G06T 17/20; G06T 9/40
See application file for complete search history.

(56) References Cited

U.S. PATENT DOCUMENTS 5,852,446 A  * 12/1998  Hashimoto ............. G06T 15/50
                                                    345/441
5,864,342 A  *  1/1999  Kajiya .................. G06T 11/001
                                                    345/589

(Continued)

*Primary Examiner* — Michael Le
(74) *Attorney, Agent, or Firm* — Nath, Goldberg & Meyer; Joshua B. Goldberg

(57) ABSTRACT

Provided is a method for compressing texture data of a three-dimensional model, including: acquiring data of polygonal surfaces constituting a contour of a target three-dimensional model, and data of a texture image and a phase plane of the contour; acquiring the texture data of texture points in a texture point group corresponding to each polygonal surface, the texture points in the texture point group including first and second texture points; assigning a weight to each texture point in each texture point group according to the texture data of the first texture points in the texture point group; calculating a sum of weights of each texture point in each texture point group; and compressing the texture data, according to a target compressed data amount, and the texture data and the sum of weights of the texture point whose sum of weights is not zero.

14 Claims, 6 Drawing Sheets

(51) Int. Cl.
  *G06T 15/04*  (2011.01)
  *G06T 17/00*  (2006.01)
  *G06T 17/20*  (2006.01)

(56) References Cited

U.S. PATENT DOCUMENTS

| | | | | |
|---|---|---|---|---|
| 6,005,582 | A * | 12/1999 | Gabriel | G06T 15/04 |
| | | | | 345/586 |
| 6,191,794 | B1 * | 2/2001 | Priem | G06T 15/04 |
| | | | | 345/428 |
| 7,130,467 | B1 * | 10/2006 | Bronder | H04N 19/94 |
| | | | | 382/218 |
| 7,205,998 | B2 * | 4/2007 | Wang | G06T 15/04 |
| | | | | 345/582 |
| 2001/0005204 | A1 * | 6/2001 | Matsumoto | G06T 15/10 |
| | | | | 345/418 |
| 2005/0226506 | A1 * | 10/2005 | Aharon | G06T 7/143 |
| | | | | 382/180 |
| 2006/0017722 | A1 * | 1/2006 | Hong | G06T 15/04 |
| | | | | 345/419 |
| 2008/0074435 | A1 * | 3/2008 | Sekine | G06T 11/001 |
| | | | | 345/582 |
| 2011/0085736 | A1 * | 4/2011 | Dmitriev | G06T 17/20 |
| | | | | 382/199 |
| 2019/0311501 | A1 * | 10/2019 | Mammou | G06T 17/00 |

* cited by examiner

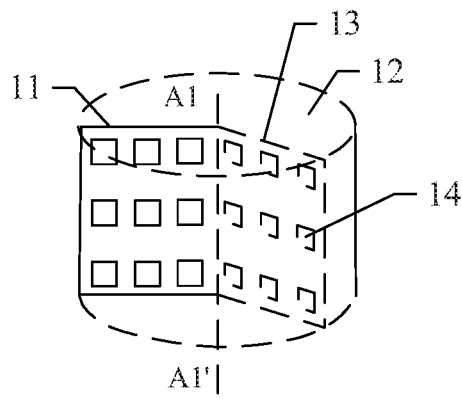

FIG. 1

```
Acquiring data of a plurality of polygonal surfaces constituting a contour of a
target three-dimensional model, data of a texture image of the contour, and data
of at least one phase plane of the contour, wherein the phase plane comprises a    S1
plurality of voxels, the texture image comprises a plurality of texture points,
and the plurality of texture points have texture data of the plurality of
polygonal surfaces
```

```
Acquiring the texture data of plural texture points in each of a plurality of      S2
texture point groups respectively corresponding to the plurality of polygonal
surfaces, wherein the plural texture points in each texture point group
comprises: first texture points and second texture points
```

```
Assigning a weight to each texture point in each of the plurality of texture       S3
point groups according to the texture data of the first texture points in the
texture point group
```

```
Calculating a sum of weights of each texture point in each of the plurality of     S4
texture point groups
```

```
Compressing the texture data, according to a target compressed data amount,        S5
and the texture data and the sum of weights of the texture point, whose sum of
weights is not zero, in each of the plurality of texture point groups
```

FIG. 2

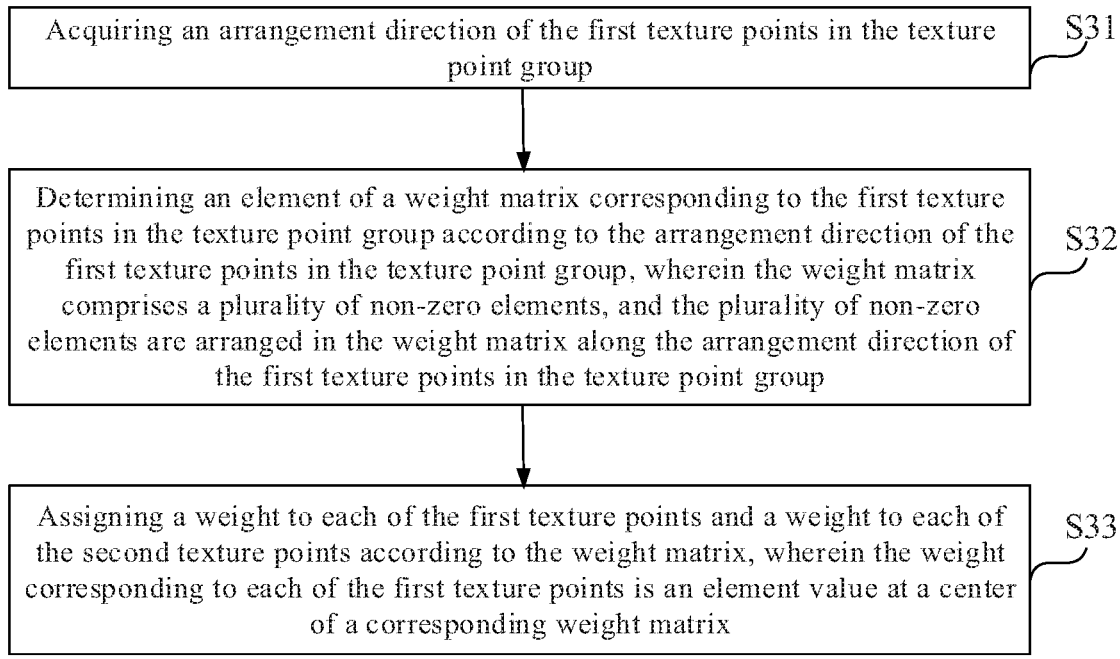
FIG. 5
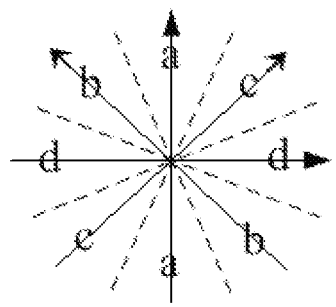
FIG. 6a
| 0 | 1/6 | 0 | | 1/6 | 0 | 0 | | 0 | 0 | 1/6 | | 0 | 0 | 0 |
|---|---|---|---|---|---|---|---|---|---|---|---|---|---|---|
| 0 | 2/3 | 0 | | 0 | 2/3 | 0 | | 0 | 2/3 | 0 | | 1/6 | 2/3 | 1/6 |
| 0 | 1/6 | 0 | | 0 | 0 | 1/6 | | 1/6 | 0 | 0 | | 0 | 0 | 0 |
| | a | | | | b | | | | c | | | | d | |
FIG. 6b

|     |     |     |     |     |     |     |     |
|-----|-----|-----|-----|-----|-----|-----|-----|
| 1/6 | 0   | 0   | 0   | 0   | 1/6 | 0   | 0   |
| 0   | 2/3 | 1/6 | 0   | 0   | 2/3 | 0   | 0   |
| 0   | 0   | 1/6 | 2/3 | 1/6 | 1/6 | 0   | 0   |
| 0   | 0   | 0   | 0   | 1/3 | 2/3 | 0   | 0   |
| 0   | 0   | 0   | 0   | 2/3 | 0   | 1/6 | 0   |
| 0   | 0   | 0   | 0   | 1/6 | 0   | 0   | 0   |

FIG. 7

Storing the color information of the texture point, whose sum of weights is not zero, in the texture point group in a memory as a node of a multi-tree, and recording in a storage node the sums of weights and a number of the texture points corresponding to the color information stored in the storage node — S51

According to the target compressed data amount, traversing leaf nodes of the storage node, deleting the leaf node that has a minimum product of the sum of weights and the number of the texture points corresponding to the color information stored therein, and storing the color information stored in the leaf node, the sum of weights and the number of the texture points corresponding to the color information, in a parent node of the leaf node — S52

FIG. 8

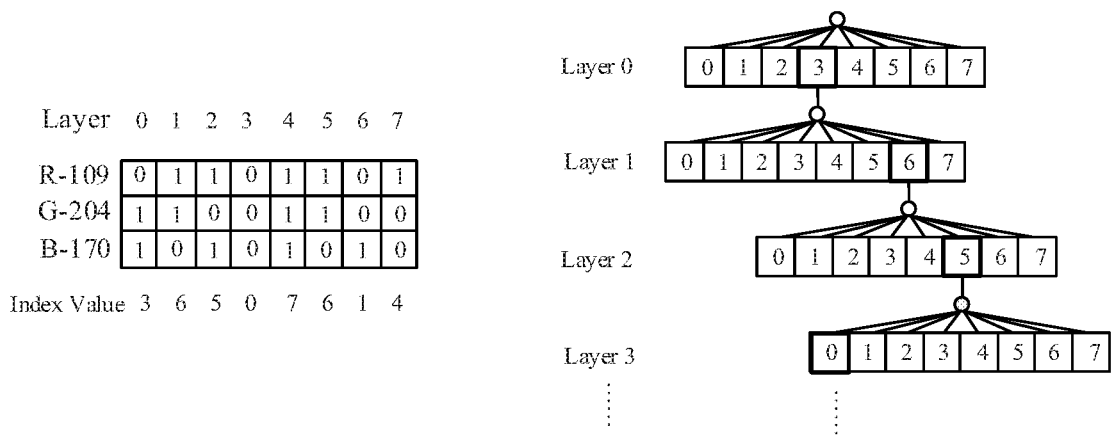

FIG. 9

METHOD FOR COMPRESSING TEXTURE DATA, DEVICE FOR COMPRESSING TEXTURE DATA, STORAGE MEDIUM, AND ELECTRONIC APPARATUS

CROSS REFERENCE TO RELATED APPLICATIONS

The present application claims the priority of Chinese patent application No. 201911292540.0, filed on Dec. 16, 2019, the content of which is hereby incorporated herein in its entirety by reference.

TECHNICAL FIELD

The present disclosure relates to the field of display technologies, and in particular, to a method for compressing texture data, a device for compressing texture data, a storage medium, and an electronic apparatus.

BACKGROUND

A true 3D (three-dimensional) volumetric display technique, which may be simply referred to as a volumetric display technique or a volumetric three-dimensional display technique, is a kind of true three-dimensional display technology, and is the latest research direction in computer stereo vision systems. Based on such a display technique, a three-dimensional image with a physical depth of field may be directly observed. An image displayed by the true 3D volumetric display technique has the advantages of being very realistic, full-vision, multi-angle of view, simultaneous multi-person observation, real-time interaction, and the like.

As one of true three-dimensional display technologies, the volumetric three-dimensional display technique may include rotating a two-dimensional display panel around a fixed rotation axis and thus resulting in a three-dimensional display space by the sweeping (or scanning) of the display panel, driving the display panel to display different images when the display panel rotates to different positions (or angles), and achieving the effect of true three-dimensional display by using visual persistence (or persistence of vision) of human eyes.

SUMMARY

Embodiments of the present disclosure provide a method for compressing texture data, a device for compressing texture data, a non-transitory computer readable storage medium, and an electronic apparatus.

A first aspect of the present disclosure provides a method for compressing texture data of a three-dimensional model, including:

acquiring data of a plurality of polygonal surfaces constituting a contour of a target three-dimensional model, data of a texture image of the contour, and data of at least one phase plane of the contour, wherein the phase plane includes a plurality of voxels, the texture image includes a plurality of texture points, and the plurality of texture points have texture data of the plurality of polygonal surfaces;

acquiring the texture data of every texture point in each of a plurality of texture point groups, wherein the plurality of texture point groups are corresponding to the plurality of polygonal surfaces, and every texture point in each of the plurality of texture point groups comprises: first texture points and second texture points;

assigning a weight to every texture point in each of the plurality of texture point groups according to the texture data of the first texture points in the texture point group;

calculating a sum of weights of every texture point in each of the plurality of texture point groups; and compressing the texture data, according to a target compressed data amount, and the texture data and the sum of weights of the texture point, whose sum of weights is not zero in each of the plurality of texture point groups.

In an embodiment, the plurality of voxels of the phase plane are arranged in a plurality of rows and a plurality of columns;

for each of the plurality of texture point groups, the texture data of the first texture points in the texture point group is acquired by:

acquiring positions of an intersection line of the phase plane and the polygonal surface corresponding to the texture point group;

acquiring a voxel, which has a smallest distance to the intersection line, in each of at least one row of voxels or in each of the at least one column of voxels of the phase plane intersecting the intersection line, and acquiring a projection point of the voxel which has the smallest distance to the intersection line on the intersection line; and determining the texture point, which has the texture data of the projection point, in the texture image as one of the first texture points in the texture point group.

In an embodiment, the texture point having the texture data of the projection point is determined according to the following formula:

$$\frac{V_1 A}{V_2 A} = \frac{T_{V_1} T_a}{T_{V_2} T_a},$$

where $V_1$ and $V_2$ are positions of a first end point and a second end point, respectively, of one side, which intersects the phase plane, of the polygonal surface, A is an intersection point of the one side with the phase plane, $T_{V_1}$ is a position of the texture point having the texture data of the first end point, $T_{V_2}$ is a position of the texture point having the texture data of the second end point, $T_a$ is a position of the texture point having the texture data of the intersection point, $V_1 A$ is a length of a line segment between the first end point $V_1$ and the intersection point A, $V_2 A$ is a length of a line segment between the second end point $V_2$ and the intersection point A, $T_{V_1} T_a$ is a length of a line segment between the position $T_{V_1}$ and the position $T_a$, and $T_{V_2} T_a$ is a length of a line segment between the position $T_{V_2}$ and the position $T_a$.

In an embodiment, the assigning a weight to each texture point in every of the plurality of texture point groups according to the texture data of the first texture points in the texture point group includes:

acquiring an arrangement direction of the first texture points in the texture point group;

determining an element of a weight matrix corresponding to the first texture points in the texture point group according to the arrangement direction of the first texture points in the texture point group, wherein the weight matrix includes a plurality of non-zero elements, and the plurality of non-zero elements are arranged in the weight matrix along the arrangement direction of the first texture points in the texture point group; and assigning a weight to each of the first texture points and a weight to each of the second texture points according to the weight matrix, wherein the weight corresponding to each of the first texture points is an element value at a center of a corresponding weight matrix.

In an embodiment, the texture data includes color information; and the compressing the texture data, according to a target compressed data amount, and the texture data and the sum of weights of the texture point, whose sum of weights is not zero, in each of the plurality of texture point groups includes:

storing the color information of the texture point, whose sum of weights is not zero, in the texture point group in a memory as a node of a multi-tree, and recording in a storage node the sums of weights and a number of the texture points corresponding to the color information stored in the storage node; and according to the target compressed data amount, traversing leaf nodes of the storage node, deleting the leaf node that has a minimum product of the sum of weights and the number of the texture points corresponding to the color information stored therein, and storing the color information stored in the leaf node, the sum of weights and the number of the texture points corresponding to the color information, in a parent node of the leaf node.

In an embodiment, the storing the color information of the texture point, whose sum of weights is not zero, in the texture point group in a memory as a node of a multi-tree includes:

acquiring components of a plurality of primary colors included in the color information;

determining an address index value of the color information according to the component of each of the plurality of primary colors; and according to the address index value, storing the color information in a storage node corresponding to the address index value.

In an embodiment, after deleting the leaf node that has a minimum product of the sum of weights and the number of the texture points corresponding to the color information stored therein, and storing the color information stored in the leaf node, the sum of weights and the number of the texture points corresponding to the color information, in a parent node of the leaf node, the method further includes:

determining any parent node as a new leaf node in when leaf nodes corresponding to the parent node are all deleted.

In an embodiment, the multi-tree is an octree.

In an embodiment, for each of the plurality of texture point groups, the second texture points in the texture point group are the texture points corresponding to vertexes of the polygonal surface corresponding to the texture point group.

A second aspect of the present disclosure provides a device for compressing texture data of a three-dimensional model, including:

a first acquisition unit, configured to acquire data of a plurality of polygonal surfaces constituting a contour of a target three-dimensional model, data of a texture image of the contour, and data of at least one phase plane of the contour, wherein the phase plane includes a plurality of voxels, the texture image includes a plurality of texture points, and the plurality of texture points have texture data of the plurality of polygonal surfaces;

a second acquisition unit, configured to acquire the texture data every texture point in each of a plurality of texture point groups, wherein the plurality of texture point groups are corresponding to the plurality of polygonal surfaces, and every texture point in each of the plurality of texture point groups comprises: first texture points and second texture points;

a weight assigner, configured to assign a weight to every texture point in each of the plurality of texture point groups according to the texture data of the first texture points in the texture point group;

a calculator, configured to calculate a sum of weights of every texture point in each of the plurality of texture point groups; and a data compressor, configured to compress the texture data, according to a target compressed data amount, and the texture data and the sum of weights of the texture point, whose sum of weights is not zero in each of the plurality of texture point groups.

In an embodiment, the plurality of voxels of the phase plane are arranged in a plurality of rows and a plurality of columns; and the second acquisition unit is further configured to:

acquire positions of an intersection line of the phase plane and the polygonal surface corresponding to each texture point group;

acquire a voxel, which has a smallest distance to the intersection line, in each of at least one row of voxels or in each of the at least one column of voxels of the phase plane intersecting the intersection line, and acquire a projection point of the voxel which has the smallest distance to the intersection line on the intersection line; and determine the texture point, which has the texture data of the projection point, in the texture image as one of the first texture points in the texture point group.

In an embodiment, the second acquisition unit is further configured to determine the texture point having the texture data of the projection point, according to the following formula:

$$\frac{V_1 A}{V_2 A} = \frac{T_{V_1} T_a}{T_{V_2} T_a},$$

where $V_1$ and $V_2$ are positions of a first end point and a second end point, respectively, of one side, which intersects the phase plane, of the polygonal surface, A is an intersection point of the one side with the phase plane, $T_{V_1}$ is a position of the texture point having the texture data of the first end point, $T_{V_2}$ is a position of the texture point having the texture data of the second end point, $T_a$ is a position of the texture point having the texture data of the intersection point, $V_1 A$ is a length of a line segment between the first end point $V_1$ and the intersection point A, $V_2 A$ is a length of a line segment between the second end point $V_2$ and the intersection point A, $T_{V_1} A T_a$ is a length of a line segment between the position $T_{V_1}$ and the position $T_a$, and $T_{V_2} T_a$ is a length of a line segment between the position $T_{V_2}$ and the position $T_a$.

In an embodiment, the second acquisition unit is further configured to:

determine the texture points corresponding to vertexes of the polygonal surface corresponding to each of the plurality of texture point groups as the second texture points in the texture point group.

A third aspect of the present disclosure provides a non-transitory computer readable storage medium, having a computer program stored thereon, wherein the computer program, when being executed by a processor, implements the method for compressing texture data of a three-dimensional model according to any one of the embodiments of the first aspect of the present disclosure.

A fourth aspect of the present disclosure provides an electronic apparatus, including:

a processor and a memory;

wherein the memory stores a computer program therein, and the computer program, when being executed by the processor, implements the method for compressing texture data of a three-dimensional model according to any one of the embodiments of the first aspect of the present disclosure.

BRIEF DESCRIPTION OF THE DRAWINGS

The accompanying drawings, which are provided for further understanding of the present disclosure and constitute a part of this specification, illustrate exemplary embodiments of the present disclosure together with the following detailed description, but are not intended to limit the present disclosure. In the drawings:

FIG. 1 is a schematic diagram showing a structure of a volumetric display device according to an embodiment of the present disclosure;

FIG. 2 is a flowchart of a method for compressing texture data according to an embodiment of the present disclosure;

FIG. 5 is a flowchart of a method for assigning weights to texture points according to an embodiment of the present disclosure;

FIG. 6a is a schematic diagram illustrating an arrangement direction of first texture points according to an embodiment of the present disclosure;

FIG. 6b is a schematic diagram showing weight matrixes according to an embodiment of the present disclosure;

FIG. 7 is a schematic diagram illustrating calculation of a weight accumulated value according to an embodiment of the present disclosure;

FIG. 8 is a flowchart of a method for compressing texture data according to an embodiment of the present disclosure;

FIG. 9 is a schematic diagram of storing color information in a memory as nodes of a multi-tree according to an embodiment of the present disclosure;

DETAILED DESCRIPTION

Figure 3:
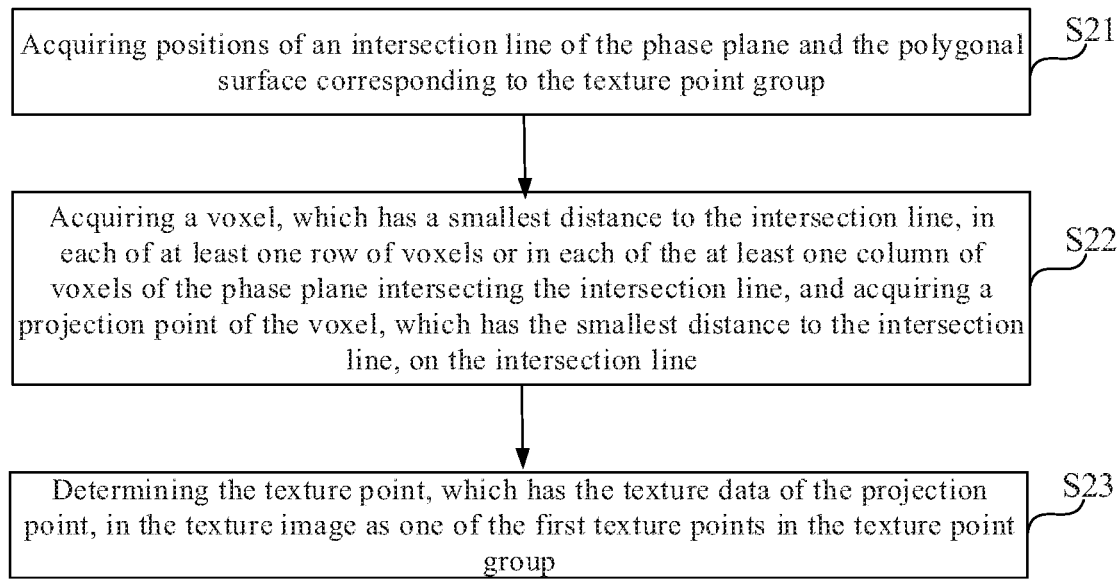
FIG. 3 is a flowchart of a method for acquiring texture data of a texture point according to an embodiment of the present disclosure.

Exemplary embodiments of the present disclosure will be described below in detail with reference to the accompanying drawings. It should be noted that the embodiments described herein are solely for illustrating and explaining the present disclosure, but are not intended to limit the present disclosure.

FIG. 1 is a schematic diagram showing a structure of a volumetric display device according to an embodiment of the present disclosure. As shown in FIG. 1, the operation principle of the volumetric display device, which is an implementation of the true three-dimensional display device, is to rotate a display panel 11 around a fixed rotation axis A1A1' and thus the sweeping (or scanning) of the display panel 11 results in a three-dimensional display space 12, drive the display panel 11 to display different images when the display panel 11 rotates to different positions (or angles), and achieve the effect of true three-dimensional display by using visual persistence (or persistence of vision) of human eyes. For example, the three-dimensional display space 12 resulted from one-circle sweeping (or scanning) of the display panel 11 may be referred to as one volume frame that includes a plurality of phase planes 13, and each of the plurality of phase planes 13 includes a plurality of pixels. When moving to each of phase planes 13, the display panel 11 may display a corresponding image. Each of the pixels on each of the phase planes 13 may be referred to as a volume pixel that is simply referred to as a voxel 14.

For example, in a case where the display panel 11 has a resolution of 240×320 and the number n of phase planes 13 included in one-circle rotation of the display panel 11 is n=360, the number of voxels 14 included in one volume frame is 240×320×360=27,648,000. Each of the voxels 14 includes position information and color information, as described below.

The position information may be expressed as x, y and z in a Cartesian coordinate system, which is generally used in the well-known simulation model of Open Graphics Library (OpenGL). Alternatively, in a cylindrical coordinate system, the position information may be expressed as: an index id_plane of the phase planes 13 (i.e., one of the $1^{st}$ to $360^{th}$ phase planes 13), and position coordinate indexes (i, j) (i.e., the row and column numbers of voxels 14 in the one phase plane 13), where each of i and j may be an integer greater than or equal to 1.

As to the color information, the color information of each voxel 14 may generally be acquired by accessing a corresponding texture point in a texture image (or texture map) using a pair of coordinate indexes (id_texture_row, id_texture_col). For example, the texture image may be a UV texture unfolded map. The color information may include a plurality of primary color component values, such as primary color component values of three primary colors of R, G and B. It should be understood that the terms "texture", "texture image", "texture point", "UV texture unfolded map", and the like employed herein may have the meanings as in the context of the OpenGL.

In summary, each of the voxels 14 may be represented as (x, y, z, r, g, b) or (id_plane, i, j, r, g, b). However, as the number of the voxels 14 increases, such representations will result in a very large amount of data and thus the response speed thereof is slow. Therefore, for each volume frame, the color information included in a texture image corresponding to a model to be displayed by the volume frame may be compressed to reduce the amount of data. An existing compression method usually traverses color information of all texture points in the texture image, and removes the color information with low occurrence frequency to achieve the compression. However, such a compression method may lose many pieces of color information with low occurrence frequency but high importance.

In view of the foregoing, an embodiment of the present disclosure provides a method for compressing texture data (which may also be referred to as a compression method for texture data) of a three-dimensional model, and FIG. 2 is a flowchart of a method for compressing texture data according to an embodiment of the present disclosure. As shown in FIG. 2, the method for compressing texture data may include the following steps S1 to S5.

Step S1 may include acquiring data of a plurality of polygonal surfaces constituting a contour (or profile or outline) of a target three-dimensional model, data of a texture image of the contour, and data of at least one phase plane of the contour. The phase plane includes a plurality of voxels, the texture image includes a plurality of texture points, and the plurality of texture points have (e.g., carry) texture data of the plurality of polygonal surfaces. For example, the data of the plurality of polygonal surfaces constituting the contour of the target three-dimensional model, the data of the texture image of the contour, and the data of the at least one phase plane of the contour may be stored in a memory or a storage device in advance.

In the embodiment of the present disclosure, a simulation display environment may be established by using the OpenGL, and the contour of the target three-dimensional model may be loaded into the simulation display environment. In the embodiment of the present disclosure, the contour of the target three-dimensional model may be formed by a plurality of triangular surfaces, and thus data of all the triangular surfaces of the target three-dimensional model may be acquired. For example, the data of the triangular surfaces may include position information of three vertexes of each of the triangular surfaces.

For clarity, one of the triangular surfaces is employed as an example in the following description unless otherwise specified.

Figure 4:
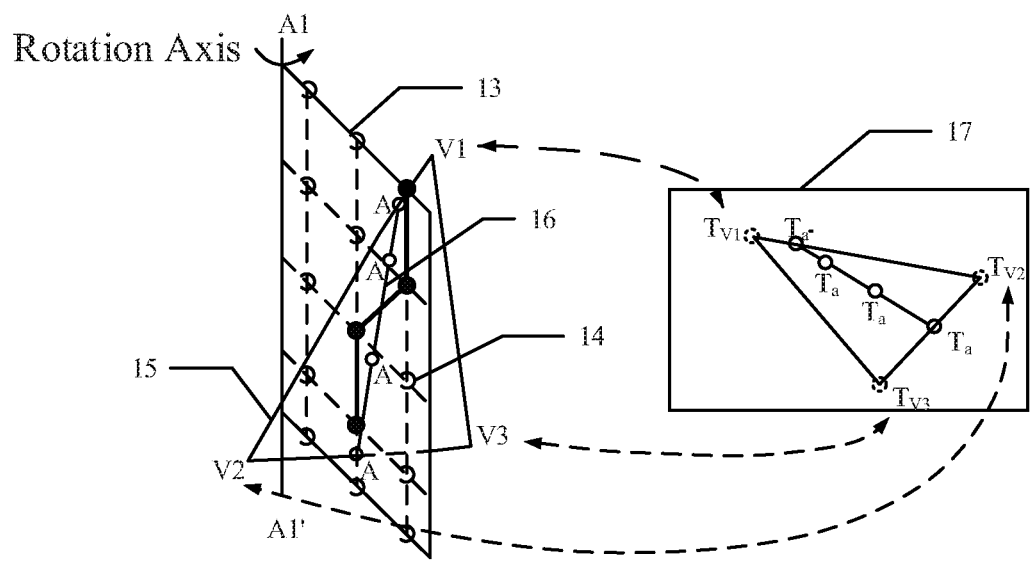
FIG. 4 is a schematic diagram illustrating locating positions of texture points according to an embodiment of the present disclosure.

In step S1, a texture image corresponding to the current volume frame is loaded, and texture data of three texture points corresponding to three vertexes of the triangular surface in the texture image is acquired. For example, the texture data of the texture points may include position information of the texture points and color information of the texture points, and each piece of color information represents a color. A phase plane in the current volume frame is acquired, and the phase plane may intersect (e.g., perpendicularly intersect) the triangular surface. The phase plane may include a plurality of voxels thereon arranged in an array. For example, a portion where the phase plane intersects the triangular surface is a portion of the triangular surface to be displayed on the phase plane. Thus, voxels on the phase plane that are close to the triangular surface correspond to the portion to be displayed. In other words, the voxels 14 included in one phase plane 13 may be arranged in a plurality of rows and a plurality of columns (as shown in FIGS. 1 and 4), and when the phase plane 13 intersects one polygonal surface (e.g., a triangular surface 15), an intersection line 16 is generated. The intersection line 16 intersects at least one row of voxels (or at least one column of voxels) of the phase plane 13. In this case, the voxels on the phase plane 13 close to the polygonal surface (e.g., the triangular surface 15) refer to: a voxel, which has the smallest distance to the intersection line 16, in each of the at least one row of voxels (or in each of the at least one column of voxels) of the phase plane 13 intersecting the intersection line 16. It should be noted that, in the embodiment of the present disclosure, the plurality of voxels in the phase plane may be virtual points. When the display panel moves to the phase plane, the display panel displays a corresponding image, and real pixel units on the display panel corresponding to the plurality of voxels are lit up to display the portion of the triangular surface corresponding to the voxels.

Step S2 may include acquiring texture data of plural texture points in a texture point group corresponding to each polygonal surface. The plural texture points in the texture point group includes: first texture points corresponding to voxels of the phase plane close to the polygonal surface, and second texture points adjacent to the first texture points, respectively. The meaning of the voxels of the phase plane close to the polygonal surface is as described above. Further, the second texture points adjacent to the first texture points, respectively, may refer to texture points corresponding to vertexes of the polygonal surface among the plural texture points in the texture point group. For example, in FIG. 4, the polygonal surface is the triangular surface 15, and texture points corresponding to respective vertexes $V_1$, $V_2$, and $V_3$ of the polygonal surface are texture points $T_{V1}$, $T_{V2}$, and $T_{V3}$. In this case, the first texture points are the four texture points $T_a$ shown in FIG. 4, and the second texture points adjacent to the four first texture points $T_a$ are texture points $T_{V1}$, $T_{V2}$, and $T_{V3}$.

In step S2, since the voxels on the phase plane close to the triangular surface correspond to the portion of the triangular surface to be displayed on the phase plane, for each triangular surface, the first texture points in the texture image corresponding to the voxels of the phase plane close to the triangular surface and the second texture points respectively adjacent to the first texture points form the texture point group. Then a step of assigning weights to each texture point group may be performed. For example, since each texture point in the texture image has color information of the triangular surface, for acquiring the first texture points in the texture image corresponding to the voxels close to the triangular surface, projection points of these voxels on the triangular surface may be acquired, and texture points respectively having color information of the projection points may be found in the texture image and taken as texture points corresponding to the voxels.

Step S3 may include assigning a weight to each texture point in each texture point group according to the texture data of the first texture points in the texture point group.

In step S3, weights may be assigned to the texture points in the texture point group according to positions of the first texture points in the texture point group. For example, according to an arrangement direction of the first texture points in the texture point group, a larger weight (e.g., ⅔ as shown in FIG. 6b) may be assigned to each first texture point in the texture point group and the second texture point(s) in the arrangement direction, whereas a smaller weight (e.g., ⅙ as shown in FIG. 6b) may be assigned to texture points in other directions.

Step S4 may include calculating a sum of weights (which may also be referred to as a weight accumulated value) of each texture point in each texture point group.

In the step S3, when weights are assigned to texture points, there may be a case where a same texture point is assigned with a weight multiple times (i.e., is assigned with multiple weights), and therefore, in step S4, the multiple weights assigned to each texture point are added up to acquire the sum (or accumulated value) of the weights of the texture point.

Step S5 may include, according to the texture data and the weight accumulated value of the texture point, whose weight accumulated value is not zero, in each texture point group and a target compressed data amount, compressing the texture data (e.g., the texture data of the texture point group may be compressed).

Specifically, each texture point in the texture image has its own color information, and for a same piece of color information, it may correspond to multiple texture points. Thus in step S5, a value of each piece of color information may be calculated according to the number of texture points corresponding to each piece of color information and the weight accumulated value of each of the texture points, and the piece of color information having a small calculated value may be incorporated into another piece of color information, thereby completing compression of the texture data.

It should be understood that, in the compression method, the steps S1 to S5 may be repeated until the texture data of the texture points of the multiple texture point groups corresponding to the plurality of polygonal surfaces are all compressed.

In the embodiment of the present disclosure, the target compressed data amount may be the number of the types (or pieces) of color information desired to be acquired after compression. For example, a common texture image is typically a 24-bit color image, in which the number of the types of color information is 16,777,216, whereas the target compressed data amount may be a smaller value, for example, 64. That is, the number of the types of color information desired to be acquired after compression is 64.

The compression method for texture data of the three-dimensional model according to the present embodiment of the present disclosure may assign a weight to each texture point in each texture point group according to the texture data of the first texture points of the texture point group, and may compress the texture data according to the texture data and the weight accumulated value of the texture point, whose weight accumulated value is not zero, in the texture image and the target compressed data amount. Therefore, compared with a compression method in the related art in which the texture data of each texture point in the texture image is merely traversed, the compression method according to the embodiment of the present disclosure may increase the probability that the texture data of each texture point in the texture point group is retained (i.e., not being removed) during compression. Since the texture data of the texture points in each texture point group corresponds to voxels close to the corresponding polygonal surface, the texture data of the texture points in the texture point group is important in three-dimensional display process. In this way, the compression method according to the embodiment of the present disclosure increases the accuracy of compressing the texture data and improves the display effect. In addition, since texture points not in any texture point group may be ignored during the compression, the compression method according to the embodiment of the present disclosure does not need to traverse all the texture points in the whole texture image, thereby improving the compression speed.

FIG. 3 is a flowchart of a method for acquiring texture data of a texture point according to an embodiment of the present disclosure. As shown in FIG. 3, for a texture point group corresponding to any one of the plurality of polygonal surfaces (e.g., corresponding to the triangular surface 15), the texture data of the first texture points in the texture point group may be acquired through the following steps S21 to S23.

Step S21 may include acquiring positions of the intersection line of the polygonal surface and the phase plane.

Step S22 may include acquiring a voxel, which has the smallest distance to the intersection line, in each of the at least one row of voxels (or in each of the at least one column of voxels) of the phase plane intersecting the intersection line, and acquiring a projection point of the voxel, which has the smallest distance to the intersection line, on the intersection line.

Step S23 may include determining the texture point, which has the texture data of the projection point, in the texture image as one of the first texture points in the texture point group.

FIG. 4 is a schematic diagram illustrating locating positions of texture points according to an embodiment of the present disclosure. As shown in FIG. 4, an example in which the polygonal surface is the triangular surface 15 having the vertexes $V_1$, $V_2$, and $V_3$ is taken, and the triangular surface 15 intersects (e.g., perpendicularly intersects) the phase plane 13. Two sides $V_1V_2$ and $V_2V_3$ of the triangular surface 15 intersect the phase plane 13, and the two sides form two intersection points with the phase plane 13 (i.e., the uppermost point A and the lowermost point A in the left part of FIG. 4). A line connecting the two intersection points is the intersection line 16 of the triangular surface 15 and the phase plane 13, and the intersection line 16 is the portion of the triangular surface 15 to be displayed on the phase plane 13. Thus, voxels (e.g. four black bold dots in the left part of FIG. 4) adjacent to the intersection line 16 are acquired, and these voxels are voxels corresponding to the part of the triangular surface 15 to be displayed on the phase plane 13. Since the texture points in the texture image 17 have texture data of the triangular surface 15, after the voxels adjacent to the intersection line 16 are acquired, projection points of these voxels on the triangular surface 15 (i.e., projection points of these voxels on the intersection line 16) may be acquired. Then, the texture points, having the texture data of the projection points, are found in the texture image 17. Since the texture data of the texture points having the texture data of the projection points is to be attached to the voxels 14, these texture points are texture points, which correspond to the voxels 14, in the texture image, i.e., the first texture points $T_a$ in the texture point group. Further, second texture points $T_{V1}$, $T_{V2}$ and $T_{V3}$ in the texture point group are adjacent to the first texture points $T_a$, respectively.

Specifically, after the voxels 14 adjacent to the intersection line 16 are acquired, a perpendicular line is drawn from the position of each of the voxels 14 to the intersection line 16, and a foot point of the perpendicular line on the intersection line 16 is the projection point of the voxel 14 on the intersection line 16 (e.g., four points A in the left part of FIG. 4). Then, a position of the texture point having the texture data of the projection point is calculated according to the following formula:

$$\frac{V_1A}{V_2A} = \frac{T_{V1}T_a}{T_{V2}T_a},$$

where $V_1$ and $V_2$ are positions of a first end point and a second end point, respectively, of one side, which intersects the phase plane 13, of the polygonal surface, A in this formula is the intersection point of the one side with the phase plane 13 (i.e., the uppermost point A in the left part of FIG. 4), $T_{V1}$ is a position of the texture point having the texture data of the first end point, $T_{V2}$ is a position of the texture point having the texture data of the second end point, $T_a$ (i.e., the uppermost point $T_a$ in the right part of FIG. 4) is a position of the texture point having the texture data of the intersection point, $V_1A$ is a length of a line segment between the first end point $V_1$ and the intersection point A, $V_2A$ is a length of a line segment between the second end point $V_2$ and the intersection point A, $T_{V1}T_a$ is a length of a line segment between the position $T_{V1}$ and the position $T_a$, and $T_{V2}T_a$ is a length of a line segment between the position $T_{V2}$ and the position $T_a$. Since $V_1$, $V_2$, A, $T_{V1}$, and $T_{V2}$ may all be directly acquired, a position of the texture point (i.e., the first texture point) $T_a$ may be acquired by equal proportion calculation. As is readily understood from the above description, the $T_{V3}$ in FIG. 4 is the position of the texture point having the texture data of the vertex $V_3$ of the triangular surface 15. Based on the same method, the lowermost point $T_a$ in the right part of FIG. 4 may be calculated. Furthermore, the middle two points $T_a$ in the right part of FIG. 4 may be calculated by interpolation.

FIG. 5 is a flowchart of a method for assigning weights to texture points according to an embodiment of the present disclosure. As shown in FIG. 5, the step of assigning a weight to each texture point in each texture point group according to the texture data of the first texture points in the texture point group may include the following steps S31 to S33.

Step S31 may include acquiring the arrangement direction of the first texture points in the texture point group.

Step S32 may include determining an element of a weight matrix corresponding to each first texture point in the texture point group according to the arrangement direction of the first texture points in the texture point group. The weight matrix includes a plurality of non-zero elements, and the non-zero elements are arranged in the weight matrix along the arrangement direction of the first texture points in the texture point group.

Step S33 may include assigning a weight to the corresponding first texture points (e.g., the four texture points T shown in the right part of FIG. 4) and a weight to the second texture points (e.g., the three texture points $T_{V1}$, $T_{V2}$, and $T_{V3}$ shown in the right part of FIG. 4) respectively adjacent to the first texture points according to the weight matrix. For example, the weight corresponding to each first texture point is the element value at the center of the corresponding weight matrix.

Specifically, FIG. 6a is a schematic diagram illustrating an arrangement direction of the first texture points according to an embodiment of the present disclosure, and FIG. 6b is a schematic diagram showing weight matrixes according to an embodiment of the present disclosure. As shown in FIGS. 6a and 6b, the arrangement direction of the first texture points may be one of the four directions, a, b, c, and d, and may be acquired by calculating a gradient value of the first texture points. For example, the direction a indicates that the first texture points are vertically arranged, the direction b indicates that the first texture points are obliquely arranged in a first direction (i.e., the top left-bottom right direction) (e.g., the arrangement direction of the four first texture points $T_a$ shown in the right part of FIG. 4 is the first direction), the direction c indicates that the first texture points are obliquely arranged in a second direction which is axially symmetric to the first direction with respect to the vertical direction, and the direction d indicates that the first texture points are horizontally arranged. The four arrangement directions correspond to four weight matrixes a', b', c' and d', respectively, the value at the central position of the weight matrix represents the weight of the first texture points in the corresponding texture point group, and the values at the other positions of the weight matrix around the central position may represent the weights of the second texture points in the corresponding texture point group. For example, a non-zero element value $2/3$ may be set at the center position of the weight matrix a' (e.g., here "element" refers to an element of the matrix), a non-zero element value $1/6$ may be set at positions vertically adjacent to the center position, and a zero element value may be set at the remaining positions. A non-zero element value $2/3$ is set at the center position of the weight matrix b', a non-zero element value $1/6$ is set at positions adjacent to the center position in the first direction, and a zero element value are set at the remaining positions. A non-zero element value $2/3$ is set at the center position of the weight matrix c', a non-zero element value $1/6$ is set at positions adjacent to the center position in the second direction, and a zero element values are set at the remaining positions. A non-zero element value $2/3$ is set at the center position of the weight matrix d', a non-zero element value $1/6$ is set at positions adjacent to the center position in the horizontal direction, and a zero element value are set at the remaining positions. By combining each texture point group with its corresponding weight matrix, a weight of each first texture point and a weight of each second texture point in the texture point group may be acquired. In the present embodiment of the present disclosure, each weight matrix may be a 3×3 weight convolution kernel.

FIG. 7 is a schematic diagram illustrating calculation of a weight accumulated value according to an embodiment of the present disclosure. As shown in FIG. 7, the dotted line in FIG. 7 represents the arrangement direction of the first texture points in the texture point group corresponding to one polygonal surface, and the solid line in FIG. 7 represents the arrangement direction of the first texture points in the texture point group corresponding to another polygonal surface. These two texture point groups employ different weight matrixes. After the weight matrixes are combined with the corresponding texture point groups, the weight matrixes have overlapped parts, and each of the texture points corresponding to the overlapped parts are assigned with a weight multiple times. Therefore, the weights of each of the texture points at the overlapped parts of the weight matrixes are summed to acquire a weight accumulated value of each texture point. Taking the 3×3 weight matrix in the top left corner of FIG. 7 as an example, this weight matrix is the weight matrix b' in FIG. 6b, a weight value of a texture point X on the right side of the center position of this weight matrix should be 0. However, the 3×3 weight matrix in the top left corner of FIG. 7 partially overlaps with another weight matrix b' as shown in FIG. 6b, and the another weight matrix b' gives the weight value $1/6$ to the texture point X. Thus, the accumulated value of the weights of the texture point X is: $0+1/6=1/6$. Other positions are analogized, and are not described in detail herein.

At present, a conventional multi-tree compression algorithm usually traverses parent nodes of leaf nodes to find a parent node having the smallest number of texture points corresponding to stored color information (i.e., the smallest number of times that the color information is used), delete all child nodes of the parent node, calculate a weighted average value of data such as color information of the all child nodes, and store the weighted average value in the parent node. However, by performing the compression in this manner, it is possible to delete a plurality of color types one time, so that the number of final color types acquired after the compression is not equal to the desired number but is smaller than the desired number.

In view of this, in the compression method for texture data according to the embodiment of the present disclosure, leaf nodes are deleted one by one (i.e., only one color type (i.e., one piece of color information) is deleted one time), so that the number of final color types acquired after compression may be equal to the desired number, and thus the accuracy of compressing texture data is improved. As described above, the texture data includes color information. FIG. 8 is a flowchart of a method for compressing texture data according to an embodiment of the present disclosure. As shown in FIG. 8, the step of compressing the texture data according to the texture data and the weight accumulated value of the texture point, whose weight accumulated value is not zero, in each texture point group and a target compressed data amount (e.g., step S5 shown in FIG. 2) may include the following steps S51 and S52.

Step S51 may include storing the color information of the texture point, whose weight accumulated value is not zero, in the texture point group in a memory as a node of a multi-tree, and recording in a storage node the weight accumulated values and the number (i.e., quantity) of the texture points corresponding to the color information stored in the storage node.

Step S52 may include, according to the target compressed data amount, traversing (e.g., checking each and every) leaf nodes of the storage node, deleting the leaf node that has the minimum product of the weight accumulated value and the number (i.e., quantity) of the texture points corresponding to the color information stored therein, and storing the color information stored in the leaf node, the weight accumulated value and the number of the texture points corresponding to the color information, in the parent node of the leaf node.

In an embodiment of the present disclosure, the multi-tree may include: a root node (ROOT), which is the root of the multi-tree, and is the topmost management node for all nodes (i.e., the starting point for all nodes). One multi-tree has only one root node. The multi-tree may further include: a parent node, which is an upper node respect to a lower child node, and the root node is definitely a parent node. The multi-tree may further include: a child node, which is a lower node with respect to an upper node, and the child node is necessarily dependent on a parent node. The multi-tree may further include: a leaf node, which is the endmost node (i.e., the lowermost node) of the multi-tree. The leaf node has no lower node, and each leaf node may represent a certain piece (or type) of color information. The target compressed data amount may be the desired number nMaxColor of the compressed color types, and may be determined according to actual needs, for example, may be 64. For example, the multi-tree may be an octree. The color information may include a red primary color component, a green primary color component, and a blue primary color component. If the color types stored in the current octree storage structure are more than the number nMaxColor of the preset color types, a merging operation is performed. In the embodiment of the present disclosure, whether to perform the merging operation on the current color information may be determined by using the value of pixelWeight× pixelCount as the calculated value of the current color information. Table 1 is a structural table of storage nodes according to the embodiment of the present disclosure, and variables for the storage nodes (each of which may correspond to one node in the multi-tree) are shown in Table 1. Taking the process of deleting a leaf node as an example, in step S52, for each leaf node, a pFather pointer is used for finding a parent node of the leaf node in an upper layer, and the parent node is taken as a sub-leaf node. In step S52, the storage nodes of a same layer (or level) is traversed by using a pNext pointer to find a sub-leaf node of the storage nodes of the layer. Next, each child node (i.e., leaf node) of the sub-leaf node is traversed, to determine a leaf node having the smallest value of pixelWeight×pixelCount and delete the leaf node, and the color information stored in the leaf node, the weight accumulated value and the number of the texture points corresponding to the color information are stored in the parent node of the leaf node. The above process is repeated until the number of leaf nodes is equal to the target compressed data amount. In the compression method for texture data according to the present embodiment of the present disclosure, the determining and deleting the child node having the smallest value of pixelWeight×pixelCount actually means one leaf node is deleted. Thus, only one color type may be deleted one time, and the accuracy of compressing texture data is improved.

In some embodiments, the step of storing the color information of the texture point, whose weight accumulated value is not zero, in the texture point group in a memory as a node of a multi-tree in step S51 may include the following steps S511 to S513.

Step S511 may include acquiring components of a plurality of primary colors included in the color information.

Step S512 may include determining an address index value of the color information according to the component of each primary color.

Step S513 may include, according to the address index value, storing the color information in a storage node corresponding to the address index value.

Specifically, FIG. 9 is a schematic diagram of storing the color information in a memory as a node of the multi-tree according to an embodiment of the present disclosure. As shown in FIG. 9, the three primary color components of the color information of the texture point that needs to be stored currently may be: red (R)=109, green (G)=204, and blue (B)=170. For example, the multi-tree may be an octree, and the 8 storage nodes in each layer of the octree may be represented by indexes 0-7. The binary representation of the red component is 01101101, the binary representation of the green component is 11001100, and the binary representation of the blue component is 10101010. As shown in the left part of FIG. 9, the red component is taken as the first row, the green component is taken as the second row, and the blue component is taken as the third row. Arranging the highest bits of the three primary color components in sequence along the direction from the first row to the last row to form a new binary value 011, converting the new binary value into a decimal number 3, and storing the decimal number 3 into a storage node with an address index value of 3 in the 0th layer of the multi-tree in the memory. Next, sequentially arranging the next highest bits of the three primary color components in the direction from the first row to the last row to form another new binary number 110, converting the another new binary number into a decimal number 6, and storing the decimal number 6 into a storage node with an address index value of 6 in the 1st layer of the multi-tree in the memory. Similar operations are repeated until the lowest bits of the three primary color components are stored in the memory as a node of the multi-tree. It should be understood that the memory may include storage nodes corresponding to the root node, the parent node(s), the child node(s), and the leaf node(s) of the multi-tree, respectively.

In some embodiments, when all leaf nodes corresponding to any parent node are deleted, the parent node is taken as a new leaf node.

TABLE 1 structural table of storage nodes.

| Node | Variable | Meaning of the variable |
|---|---|---|
| Node | isLeaf | Is the current storage node a leaf node |
| | pixelCount | The number of texture points corresponding to the current color information |

TABLE 1-continued structural table of storage nodes.

| Node | Variable | Meaning of the variable |
|---|---|---|
| | redSum | A sum for the red component |
| | greenSum | A sum for the green component |
| | blueSum | A sum for the blue component |
| | * pChild[8] | A pointer to storage nodes in the next layer |
| | * pNext | A pointer to a next storage node in the current layer |
| | pixel Weight | The weight accumulated value of the texture points corresponding to the current color information |
| | isSubLeaf | Is the current storage node a sub-leaf node |
| | * pFather | A pointer to a parent node in an upper layer |

Figure 10:
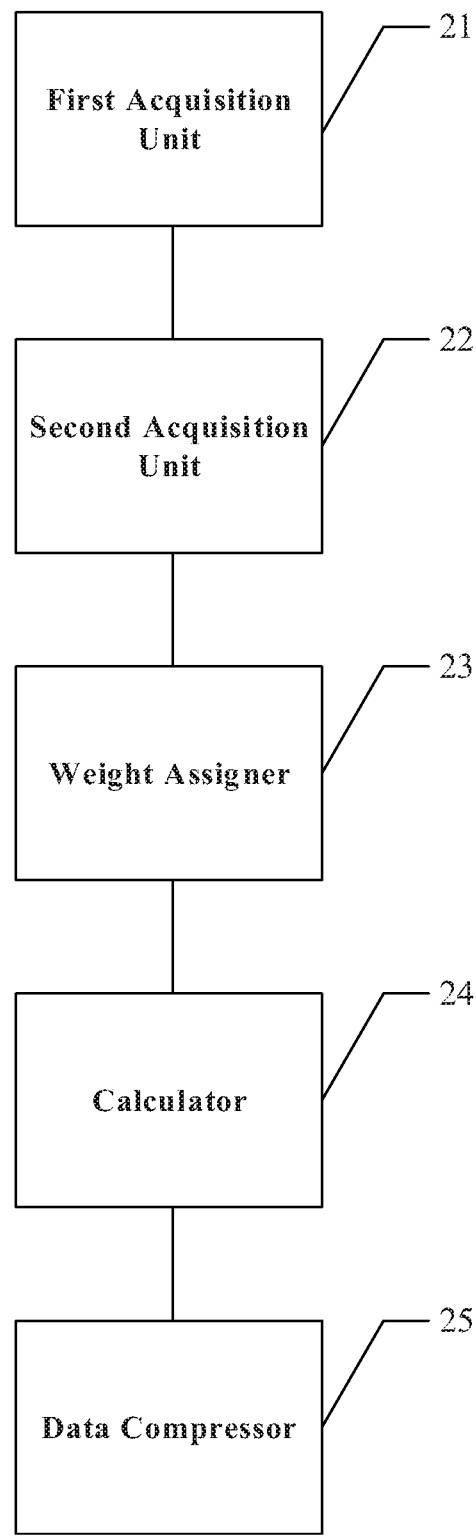
FIG. 10 is a schematic diagram showing a structure of a device for compressing texture data according to an embodiment of the present disclosure.

An embodiment of the present disclosure provides a device for compressing texture data (which may also be referred to as a compression device for texture data) of the three-dimensional model. FIG. 10 is a schematic diagram showing a structure of a device for compressing texture data according to an embodiment of the present disclosure. As shown in FIG. 10, the compression device for texture data may include a first acquisition unit 21, a second acquisition unit 22, a weight assigner 23, a calculator 24, and a data compressor 25.

The first acquisition unit 21 is configured to acquire data of polygonal surfaces forming a contour of the target three-dimensional model, data of a texture image of the contour, and data of at least one phase plane of the contour. The phase plane includes a plurality of voxels, the texture image includes a plurality of texture points, and the plurality of texture points have texture data of the polygonal surfaces.

The second acquisition unit 22 is configured to acquire texture data of plural texture points in a texture point group corresponding to each polygonal surface. The plural texture points in the texture point group includes: first texture points corresponding to voxels of the phase plane close to a same polygonal surface, and second texture points adjacent to the first texture points, respectively.

The weight assigner 23 is configured to assign a weight to each texture point in each texture point group according to the texture data of the first texture points in the texture point group.

The calculator 24 is configured to calculate a sum (which may be referred to as accumulated value) of weights of each texture point in each texture point group.

The data compressor 25 is configured to, according to the texture data and the weight accumulated value of the texture point, whose weight accumulated value is not zero, in each texture point group and a target compressed data amount, compress the texture data.

For example, the first acquisition unit 21, the second acquisition unit 22, the weight assigner 23, the calculator 24 and the data compressor 25 of the compression device for texture data shown in FIG. 10 may be respectively configured to perform steps S1 to S5 of the compression method for texture data shown in FIG. 2 and steps related to these steps S1 to S5. For example, the first acquisition unit 21 may be configured to perform step S1 and its related steps. The second acquisition unit 22 may be configured to perform step S2, steps S21 to S23 shown in FIG. 3, and related steps thereof. The weight assigner 23 may be configured to perform step S3, steps S31 to S33 shown in FIG. 5, and related steps thereof. The calculator 24 may be configured to perform step S4 and its related steps. The data compressor 25 may be configured to perform step S5, steps S51 to S52 shown in FIG. 8, and related steps thereof.

Each of the first acquisition unit 21, the second acquisition unit 22, the weight assigner 23, the calculator 24, and the data compressor 25 may be implemented by hardware, software, or a combination of hardware and software. In an embodiment, each of the first acquisition unit 21, the second acquisition unit 22, the weight assigner 23, the calculator 24, and the data compressor 25 may be an Integrated Circuit (IC) having the respective functions as described above. In an embodiment, the first acquisition unit 21, the second acquisition unit 22, the weight assigner 23, the calculator 24, and the data compressor 25 may be implemented by at least one Central Processing Unit (CPU) or at least one Application Processor (AP) executing computer programs stored in a memory.

The compression device for texture data of the three-dimensional model according to the embodiment of the present disclosure may assign a weight to each texture point in each texture point group according to the texture data of the first texture points of the texture point group, and may compress the texture data according to the texture data and the weight accumulated value of the texture point, whose weight accumulated value is not zero, in the texture image and the target compressed data amount. Therefore, compared with a compression device in the related art in which the texture data of each texture point in the texture image is merely traversed, the compression device according to the embodiment of the present disclosure may increase the probability that the texture data of each texture point in the texture point group is retained (i.e., not being removed) during compression. Since the texture data of the texture points in each texture point group corresponds to voxels close to the corresponding polygonal surface, the texture data of the texture points in the texture point group is important in three-dimensional display process. In this way, the compression device according to the embodiment of the present disclosure increases the accuracy of compressing the texture data and improves the display effect. In addition, since texture points not in any texture point group may be ignored during the compression, the compression device according to the embodiment of the present disclosure does not need to traverse (e.g., check each and every) all the texture points in the whole texture image, thereby improving the compression speed.

An embodiment of the present disclosure provides a non-transitory computer readable storage medium having a computer program stored thereon, and when being executed by a processor, the computer program implements the compression method for texture data of the three-dimensional model according to any one of the foregoing embodiments of the present disclosure.

Figure 11:
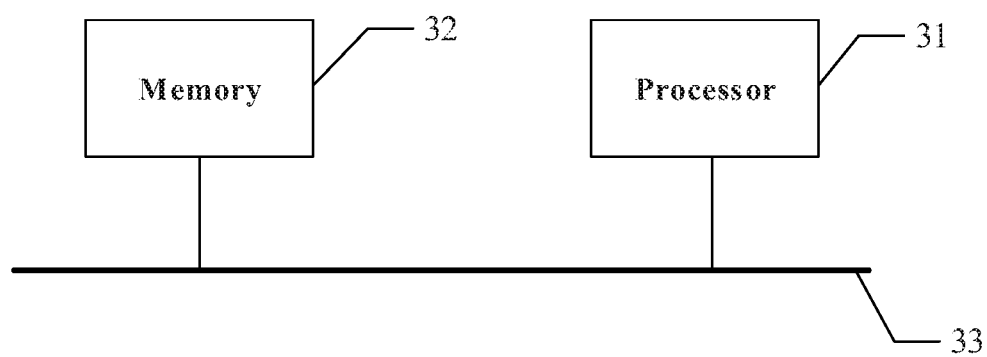
FIG. 11 is a schematic diagram showing a structure of an electronic apparatus according to an embodiment of the present disclosure.

An embodiment of the present disclosure provides an electronic apparatus, and FIG. 11 is a schematic diagram showing a structure of the electronic apparatus according to an embodiment of the present disclosure. As shown in FIG. 11, the electronic apparatus includes a processor 31 and a memory 32. The memory 32 may store a computer program therein, and the computer program, when executed by the processor 31, implements the compression method for texture data of the three-dimensional model according to any one of the foregoing embodiments of the present disclosure.

The processor 31 may be a central processing unit (CPU), a general-purpose processor, a digital signal processor (DSP), an application specific integrated circuit (ASIC), a field programmable gate array (FPGA) or other programmable logic device, a transistor logic device, a hardware component, or any combination thereof, which may implement or execute the various illustrative logical blocks, modules, and circuits described in connection with the embodiments of the present disclosure. The processor 31 may also be a combination of devices having computing functions, e.g., a combination including one or more microprocessors, a combination of the DSP and the microprocessor, or the like.

The Memory 32 may be a read only memory (ROM) or other types of static storage device that may store static information and instructions, a random access memory (RAM) or other types of dynamic storage device that may store information and instructions, an electrically erasable programmable read only memory (EEPROM), a compact disc read only memory (CD-ROM) or other optical disc storage, optical disc storage (including a compact disc, a laser disc, an optical disc, a digital versatile disc, a blue-ray disc, etc.), a magnetic disk storage medium or other magnetic storage device, or any other medium that may be used to carry or store desired program code in the form of instructions or data structures and that may be accessed by a computer. However, the present disclosure is not limited thereto.

The processor 31 and the memory 32 may be connected to each other by a bus 33, and the bus 33 may include a channel for communicating information between the above-described components. The bus 33 may be a peripheral component interconnect (PCI) bus, an extended industry standard architecture (EISA) bus, or the like. The bus 33 may include an address bus, a data bus, a control bus, and the like. For ease of illustration, only one thick line is shown in FIG. 11 to indicate the bus 33, but it is not intended that the bus 33 have only one line or one type of bus.

It should be understood that the above embodiments are merely exemplary embodiments for explaining the principles of the present disclosure, and the present disclosure is not limited thereto. It will be apparent to one of ordinary skill in the art that various changes and modifications may be made therein without departing from the scope and the spirit of the present disclosure, and these changes and modifications also fall within the scope of the present disclosure.

What is claimed is:

1. A method for compressing texture data of a three-dimensional model, comprising:
acquiring data of a plurality of polygonal surfaces constituting a contour of a target three-dimensional model, data of a texture image of the contour, and data of at least one phase plane of the contour, wherein the phase plane comprises a plurality of voxels, the texture image comprises a plurality of texture points, and the plurality of texture points have texture data of the plurality of polygonal surfaces;
acquiring the texture data of every texture point in each of a plurality of texture point groups, wherein the plurality of texture point groups correspond to the plurality of polygonal surfaces, every texture point in each of the plurality of texture point groups comprises: first texture points and second texture points, the first texture points are all on an intersection line of the phase plane and the polygonal surface corresponding to each texture point group, and the second texture points are all vertexes of the polygonal surface corresponding to the texture point group;
assigning a weight to every texture point in each of the plurality of texture point groups according to the texture data of the first texture points in the texture point group;
calculating a sum of weights of every texture point in each of the plurality of texture point groups; and
compressing the texture data, according to a target compressed data amount, and the texture data and the sum of weights of the texture point, whose sum of weights is not zero in each of the plurality of texture point groups.

2. The method according to claim 1, wherein
the plurality of voxels of the phase plane are arranged in a plurality of rows and a plurality of columns;
for each of the plurality of texture point groups, the texture data of the first texture points in the texture point group is acquired by:
acquiring positions of the intersection line of the phase plane and the polygonal surface corresponding to the texture point group;
acquiring a voxel, which has a smallest distance to the intersection line, in each of at least one row of voxels or in each of the at least one column of voxels of the phase plane intersecting the intersection line, and acquiring a projection point of the voxel which has the smallest distance to the intersection line on the intersection line; and
determining the texture point, which has the texture data of the projection point, in the texture image as one of the first texture points in the texture point group.

3. The method according to claim 2, wherein the texture point having the texture data of the projection point is determined according to the following formula:

$$\frac{V_1 A}{V_2 A} = \frac{T_{V_1} T_a}{T_{V_2} T_a},$$

where $V_1$ and $V_2$ are positions of a first end point and a second end point, respectively, of one side, which intersects the phase plane, of the polygonal surface, A is an intersection point of the one side with the phase plane, $T_{V_1}$ is a position of the texture point having the texture data of the first end point, $T_{V_2}$ is a position of the texture point having the texture data of the second end point, $T_a$ is a position of the texture point having the texture data of the intersection point, $V_1 A$ is a length of a line segment between the first end point $V_1$ and the intersection point A, $V_2 A$ is a length of a line segment between the second end point $V_2$ and the intersection point A, $T_{V_1} T_a$ is a length of a line segment between the position $T_{V_1}$ and the position $T_a$, and $T_{V_2} T_a$ is a length of a line segment between the position $T_{V_2}$ and the position $T_a$.

4. The method according to claim 1, wherein the assigning a weight to every texture point in each of the plurality of texture point groups according to the texture data of the first texture points in the texture point group comprises:
acquiring an arrangement direction of the first texture points in the texture point group;
determining an element of a weight matrix corresponding to the first texture points in the texture point group according to the arrangement direction of the first texture points in the texture point group, wherein the weight matrix comprises a plurality of non-zero elements, and the plurality of non-zero elements are arranged in the weight matrix along the arrangement direction of the first texture points in the texture point group; and assigning a weight to each of the first texture points and a weight to each of the second texture points according to the weight matrix, wherein the weight corresponding to each of the first texture points is an element value at a center of a corresponding weight matrix.

5. The method according to claim 1, wherein
the texture data comprises color information; and
the compressing the texture data, according to a target compressed data amount, and the texture data and the sum of weights of the texture point, whose sum of weights is not zero, in each of the plurality of texture point groups comprises:
storing the color information of the texture point, whose sum of weights is not zero, in the texture point group in a memory as a node of a multi-tree, and recording in a storage node the sums of weights and a number of the texture points corresponding to the color information stored in the storage node; and
according to the target compressed data amount, traversing leaf nodes of the storage node, deleting the leaf node that has a minimum product of the sum of weights and the number of the texture points corresponding to the color information stored therein, and storing the color information stored in the leaf node, the sum of weights and the number of the texture points corresponding to the color information, in a parent node of the leaf node.

6. The method according to claim 5, wherein
the storing the color information of the texture point, whose sum of weights is not zero, in the texture point group in a memory as a node of a multi-tree comprises:
acquiring components of a plurality of primary colors comprised in the color information;
determining an address index value of the color information according to the component of each of the plurality of primary colors; and
according to the address index value, storing the color information in a storage node corresponding to the address index value.

7. The method according to claim 6, wherein
after deleting the leaf node that has a minimum product of the sum of weights and the number of the texture points corresponding to the color information stored therein, and storing the color information stored in the leaf node, the sum of weights and the number of the texture points corresponding to the color information, in a parent node of the leaf node, the method further comprises:
determining any parent node as a new leaf node when leaf nodes corresponding to the parent node are all deleted.

8. The method according to claim 5, wherein the multi-tree is an octree.

9. A non-transitory computer readable storage medium, having a computer program stored thereon, wherein the computer program, when being executed by a processor, implements the method for compressing texture data of a three-dimensional model according to claim 1.

10. An electronic apparatus, comprising:
a processor and a memory;
wherein the memory stores a computer program therein, and the computer program, when being executed by the processor, implements the method for compressing texture data of a three-dimensional model according to claim 1.

11. A device for compressing texture data of a three-dimensional model, comprising:
a first acquisition unit, configured to acquire data of a plurality of polygonal surfaces constituting a contour of a target three-dimensional model, data of a texture image of the contour, and data of at least one phase plane of the contour, wherein the phase plane comprises a plurality of voxels, the texture image comprises a plurality of texture points, and the plurality of texture points have texture data of the plurality of polygonal surfaces;
a second acquisition unit, configured to acquire the texture data of every texture point in each of a plurality of texture point groups, wherein the plurality of texture point groups correspond to the plurality of polygonal surfaces, and every texture point in each of the plurality of texture point groups comprises: first texture points and second texture points, the first texture points are all on an intersection line of the phase plane and the polygonal surface corresponding to each texture point group, and the second texture points are all vertexes of the polygonal surface corresponding to the texture point group;
a weight assigner, configured to assign a weight to every texture point in each of the plurality of texture point groups according to the texture data of the first texture points in the texture point group;
a calculator, configured to calculate a sum of weights of every texture point in each of the plurality of texture point groups; and
a data compressor, configured to compress the texture data, according to a target compressed data amount, and the texture data and the sum of weights of the texture point, whose sum of weights is not zero in each of the plurality of texture point groups.

12. The device according to claim 11, wherein
the plurality of voxels of the phase plane are arranged in a plurality of rows and a plurality of columns; and
the second acquisition unit is further configured to:
acquire positions of the intersection line of the phase plane and the polygonal surface corresponding to each texture point group;
acquire a voxel, which has a smallest distance to the intersection line, in each of at least one row of voxels or in each of the at least one column of voxels of the phase plane intersecting the intersection line, and acquire a projection point of the voxel which has the smallest distance to the intersection line on the intersection line; and
determine the texture point, which has the texture data of the projection point, in the texture image as one of the first texture points in the texture point group.

13. The device according to claim 12, wherein
the second acquisition unit is further configured to determine the texture point having the texture data of the projection point, according to the following formula:

$$\frac{V_1 A}{V_2 A} = \frac{T_{V_1} T_a}{T_{V_2} T_a},$$

where $V_1$ and $V_2$ are positions of a first end point and a second end point, respectively, of one side, which intersects the phase plane, of the polygonal surface, A is an intersection point of the one side with the phase plane, $T_{V_1}$ is a position of the texture point having the texture data of the first end point, $T_{V2}$ is a position of the texture point having the texture data of the second end point, $T_a$ is a position of the texture point having the texture data of the intersection point, $V_1A$ is a length of a line segment between the first end point $V_1$ and the intersection point A, $V_2A$ is a length of a line segment between the second end point $V_2$ and the intersection point A, $T_{V1}T_a$ is a length of a line segment between the position $T_{V1}$ and the position $T_a$, and $T_{V2}T_a$ is a length of a line segment between the position $T_{V2}$ and the position $T_a$.

14. The device according to claim 11, wherein
the second acquisition unit is further configured to:
determine the texture points corresponding to vertexes of the polygonal surface corresponding to each of the plurality of texture point groups as the second texture points in the texture point group.

* * * * *